United States Patent
Ferrari et al.

(10) Patent No.: US 11,695,479 B2
(45) Date of Patent: Jul. 4, 2023

(54) TRANSMITTERS AND RECEIVERS

(71) Applicants: Cambridge Enterprise Limited, Cambridge (GB); Consorzio Nazionale Interuniversitario per le Telecomunicazioni (CNIT), Parma (IT)

(72) Inventors: Andrea C. Ferrari, Cambridge (GB); Marco Romagnoli, Milan (IT); Michele Midrio, Udine (IT); Alberto Montanaro, Pisa (IT); Vito Sorianello, San Giuliano Terme (IT)

(73) Assignees: Consorzio Nazionale Interuniversitario Per Le Telecomunicazioni, Parma (IT); Cambridge Enterprise Limited, Cambridge (GB)

( * ) Notice: Subject to any disclaimer, the term of this patent is extended or adjusted under 35 U.S.C. 154(b) by 108 days.

(21) Appl. No.: 17/436,575

(22) PCT Filed: Feb. 27, 2020

(86) PCT No.: PCT/GB2020/050475
§ 371 (c)(1),
(2) Date: Sep. 3, 2021

(87) PCT Pub. No.: WO2020/178558
PCT Pub. Date: Sep. 10, 2020

(65) Prior Publication Data
US 2022/0149946 A1    May 12, 2022

(30) Foreign Application Priority Data
Mar. 6, 2019 (GB) .................................. 1902971

(51) Int. Cl.
*H04B 10/40* (2013.01)
*H04B 1/38* (2015.01)
*H04B 10/64* (2013.01)

(52) U.S. Cl.
CPC ............... *H04B 10/40* (2013.01); *H04B 1/38* (2013.01); *H04B 10/64* (2013.01); *H04B 2210/006* (2013.01)

(58) Field of Classification Search
CPC .. H04B 10/40; H04B 10/64; H04B 2210/006; H04B 1/38
(Continued)

(56) References Cited

U.S. PATENT DOCUMENTS 9,716,553 B2 * 7/2017 Bogoni .............. H04B 10/2575
2015/0372159 A1   12/2015 Englund et al.
(Continued)

FOREIGN PATENT DOCUMENTS

CN    108232462 A    6/2018
CN    108232462 A    1/2019
(Continued)

OTHER PUBLICATIONS

International Searching Authority, International Search Report and Written Opinion, mailed in relationship to International Application No. PCT/GB2020/050475, dated Jun. 15, 2020 (12 pages).
Intellectual Property Office, Search Report under Section 17(5), mailed in relationship to United Kingdom Application No. GB 1902971.9, dated Sep. 6, 2019 (3 pages).
Ducournau, G. et al., Optically power supplied Gbit/s wireless hotspot using 1.55 mm THz photomixer and heterodyne detection at 200 GHz, Electronics Letter, 46(19): pages, Sep. 16, 2010 (2 Pages).
(Continued)

*Primary Examiner* — Dalzid E Singh
(74) *Attorney, Agent, or Firm* — Thomas Horstemeyer, LLP (57) ABSTRACT

An RF transmitter comprising an optical source configured to generate a pair of optical lines separated by an RF carrier frequency. The transmitter may comprise a graphene photodetector having at least two electrical contacts; a transmit antenna coupled to a first of the electrical contacts; and an
(Continued)

electrical data signal input connected to a second of the electrical contacts. The graphene photodetector is illuminated by the optical source; it may comprise a graphene photo-thermal effect (PTE) photodetector or a bolometric photodetector. A corresponding receiver is also described.

25 Claims, 4 Drawing Sheets

(58) Field of Classification Search
USPC .......................................................... 398/135
See application file for complete search history.

(56) References Cited

U.S. PATENT DOCUMENTS

| | | | | |
|---|---|---|---|---|
| 2017/0301819 | A1* | 10/2017 | Yao | H01L 31/028 |
| 2019/0013869 | A1* | 1/2019 | Alic | H01S 5/4087 |
| 2019/0157757 | A1* | 5/2019 | Murakowski | H01Q 21/0025 |

FOREIGN PATENT DOCUMENTS

| | | |
|---|---|---|
| CN | 109375390 A | 2/2019 |
| CN | 109375690 A | 2/2019 |
| WO | 2018/060705 A1 | 4/2018 |

OTHER PUBLICATIONS

Laghezza, F. et al., Photonics-Assisted Multiband RF Transceiver for Wireless Communications, Journal of Lightwave Technology, IEEE, 32(16):2896-2904, Aug. 15, 2014 (9 pages).
Capmany, J. et al., Graphene Integrated Microwave Photonics, Journal of Lightwave Technology, IEEE, 32(20): 3785-3796, Oct. 1, 2014 (12 pages).
Ghelfi, P. et al., Photonics in Radar Systems: RF Integration for State-of-the-Art Functionality, IEEE Microwave Magazine, 16(8): 74-83, Sep. 1, 2015.
Ducournau et al., Optically power supplied Gbit/s wireless hotspot using 1.55mm THz photomixer and heterodyne detection at 200 GHz, Electronics Letters, 46(19), Sep. 16, 2010 (2 pages).
Ghelfi et al., Photonics in Radar Systems: RF Intergration for State of the Art Funtctionality, IEEE Microwave Magazine, 16(8): 74-83, Sep. 2015 (10 pages).
Capmany et al., Graphene Intergrated Microwave Photonics, Jouornal of Lightwave Technology, IEEE, 32(20): 3785-3796, Oct. 15, 2014 (12 pages).
Laghezza et al., Photonics-Assisted Multiband RF Transceiver for Wireless Communication, Journal of Lightwave Technology, IEEE, 32(16): 2896-2904, Aug. 15, 2014 (9 pages).

* cited by examiner

TRANSMITTERS AND RECEIVERS

FIELD

This invention relates to generally to RF transmitters and receivers for high frequencies such as millimetre-wave, sub-millimetre wave and terahertz frequencies. In this specification RF (radio frequency) includes millimetre-wave, sub-millimetre wave and terahertz frequencies.

The project leading to this application has received funding from the European Union's Horizon 2020 research and innovation programme under grant agreement No 649953.

BACKGROUND

Telecommunication services are expected to require an increase of bandwidth in the next few years, with projected data traffic of more than 500 Mb/s per user by 2020. High speed communication links can be realized either with optical fibers, or wireless. In urban contexts, wireless links are preferable because of ease of ubiquitous deployment, and lower installation costs.

However, to allow for data rates comparable with optical fibers, future wireless communications cannot be implemented with the same relatively low carrier frequencies as those of systems used nowadays, which use a carrier frequency of a few GHz at best, leaving no room for transmission rates beyond few Mb/s. Larger transmission rates need an upshift of the carrier frequencies. Millimetre waves, that is electromagnetic waves with frequencies ranging between 30 and 300 GHz, are candidates for next generation wireless systems. Within this broad range of frequencies, some bands are particularly suitable for telecommunications due to relatively small atmospheric absorption. Some of these are bands are centered around 35, 90, 140 and 220 GHz but depending on the application the carrier frequency may be in excess of 220 GHz up to the THz range.

Existing electrical semiconductor devices have a usable upper frequency in the tens of gigahertz. New techniques will be needed for higher frequencies, for example to support higher data rates.

Figure 1:
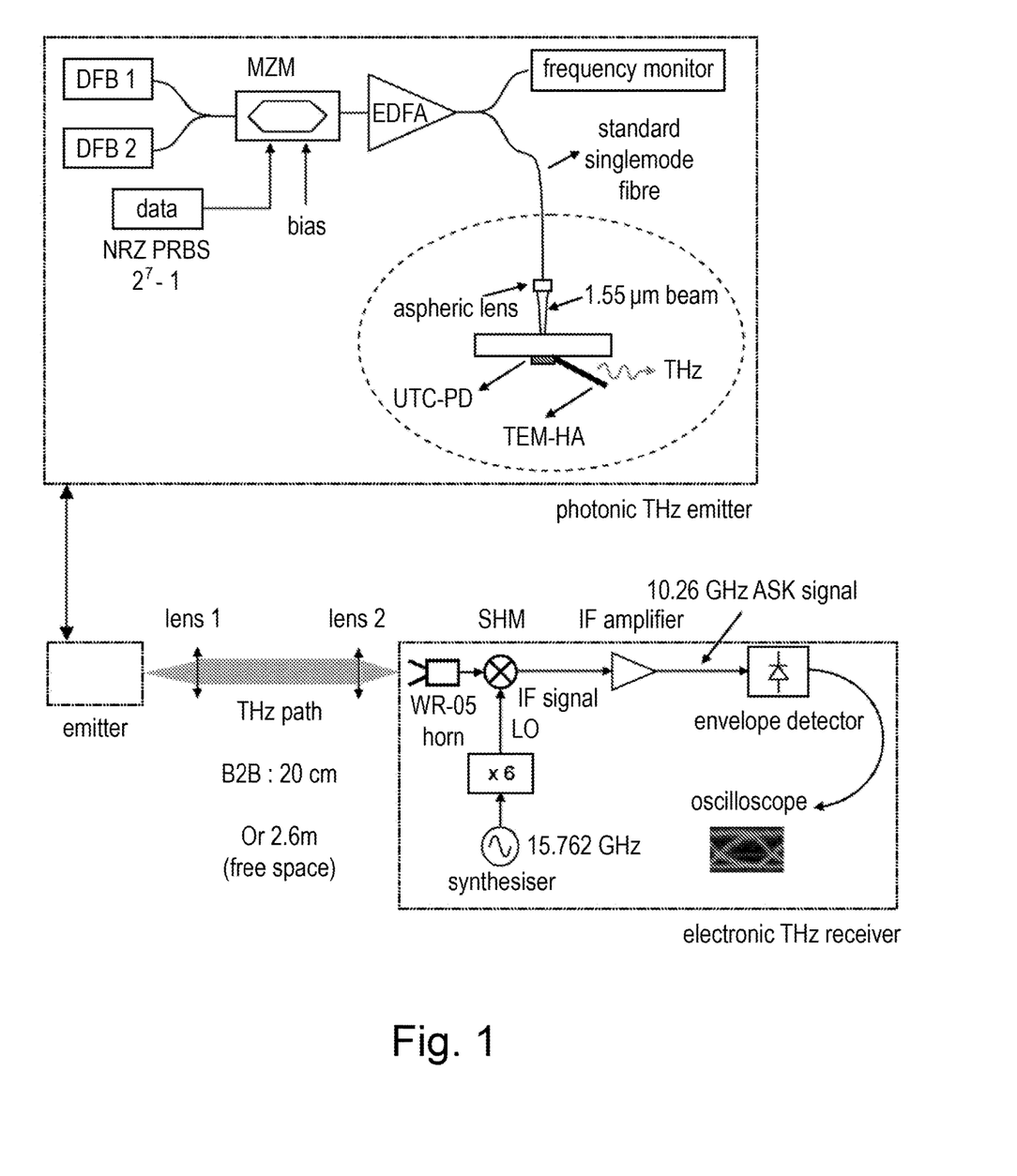
FIG. 1 shows an experimental system used to transmit a data stream using a 200 GHz carrier frequency according to the prior art.

FIG. 1, from G. Ducournau et al, "Optically power supplied Gbit/s wireless hotspot using 1.55 mm THz photomixer and heterodyne detection at 200 GHz", *Electron. Lett*, 46 (2010), shows an experiment used to transmit a data stream using a 200 GHz carrier frequency. Two distributed feedback (DFB) 1.55 mm lasers are used to produce a dual wavelength signal with a 200 GHz frequency separation. The dual wavelength signal is amplitude modulated by a 10 GHz bandwidth integrated Mach-Zehnder modulator (MZM). After the modulation stage, the signal is amplified with an erbium-doped fibre amplifier (EDFA) and split into two paths: one for a wavelength meter and the other one to feed an InGaAs/InP UTC-PD (unitravelling carrier photodiode). The signal generated by the UTC-PD feeds the transmission antenna (TEM-HA in FIG. 2). At the receiver the 200 GHz signal is first mixed in a sub-harmonic mixer (SHM). The local oscillator (LO) which feeds the sub-harmonic mixer is a 15.762 GHz microwave synthesiser followed by a ×6 active multiplier. The intermediate frequency (IF) is equal to 10.3 GHz and therefore a 10.3 GHz amplitude shift keying (ASK) modulated signal is obtained. Lastly, this IF signal is amplified (50 dB) and detected by an envelope detector based on a low barrier Schottky diode.

Some improvements on this technology will be described. Background prior art is described in WO 2018/060705; CN109375390A; and CN108232462A.

SUMMARY

The invention is set out in the claims.

In one aspect there is therefore described an RF data transmitter comprising an optical source configured to generate a pair of optical lines separated by an RF carrier frequency. The transmitter further comprises a photodetector comprising a layer of graphene; the photodetector may be a graphene photo-thermal effect (PTE) photodetector or a bolometric detector. In implementations the graphene photodetector has at least two electrical contacts. A transmit antenna may be electrically coupled to a first, in particular output, one of the electrical contacts. An electrical data signal input may be connected to a second, in particular input, one of the electrical contacts. The transmit antenna may be coupled to the first of the electrical contacts via an electrical amplifier. The layer of graphene of the photodetector is illuminated by the optical source.

In some implementations, but not essentially, the graphene photodetector comprises a layer of graphene adjacent an optical waveguide. The graphene photodetector may have electrical contacts to the layer of graphene at points to either side of a centre of the waveguide. The electrical amplifier may comprise a broadband low-noise electrical amplifier. An input of the electrical amplifier may be coupled to the first of the electrical contacts; an output of the electrical amplifier may be coupled to the transmit antenna.

The RF data transmitter may include a dielectric substrate bearing the waveguide and the transmit antenna, and the electrical amplifier (where present). The layer of graphene may overlie the waveguide. The first of the electrical contacts may connect the layer of graphene to an input feed of the transmit antenna. The dielectric substrate may be supported on a semiconductor, e.g. silicon, substrate In broad terms the graphene photo-thermal effect (PTE) photodetector may be configured, for example through doping and/or biasing of the layer of graphene, so that it generates a voltage through local heating (caused by the light) and the Seebeck effect. The bolometric graphene detector may be configured such that local heating (caused by the light) modulates a resistance of the photodetector, e.g. via a temperature coefficient of resistance (TCR) of the layer. In both cases the output to the transmit antenna may be coupled to the layer of graphene.

When configured as a PTE photodetector the signal input may be connected to a gate electrode of the device; this may be at least partially located over the waveguide (or other light impinging region). A second connection to the layer of graphene (i.e. third photodetector electrode) may provide a reference e.g. ground connection. Optionally a second gate electrode may be provided to bias the layer of graphene; this may be connected to ground or to a DC voltage level. Optionally a bias voltage may be applied, e.g. by a biasing system, to the first gate electrode.

When configured as a bolometric photodetector the signal input may be connected to the layer of graphene, for example so that the first and second connections to the layer of graphene are on opposite sides of the waveguide (or other light impinging region). In this latter case the light can modulate the resistance between the two connections. Where a semiconductor substrate is provided this may be employed as a reference e.g. bias connection for the bolometric photodetector, but this is not essential. Again such a bias connection may be connected to ground or to a DC voltage level from a biasing system.

Thus in some implementations the transmitter comprises a graphene photo-thermal effect (PTE) photodetector having two photodetector contacts to output a PTE-generated voltage and having at least one gate electrode. The transmitter may further comprise a transmit antenna, which may be coupled to at least one of the photodetector contacts. The transmitter further comprises an electrical data signal input which may be connected to the at least one gate electrode. The transmitter may be configured such that the graphene photodetector, in particular the graphene PTE photodetector, is illuminated by the optical source.

In implementations a transmitter of the type described above is capable of transmitting at an RF carrier frequency above 10 GHz and or above 100 GHz, for example up to several THz, facilitated in part by the good electron transport properties, but also by the PTE operating mode which facilitates low noise and high efficiency.

In some PTE-based implementations the at least one gate electrode is biased to generate a Seebeck effect in a graphene layer of the graphene photo-thermal effect photodetector. The bias may be provided by a bias voltage generator coupled to the at least one gate electrode. In some implementations two gate electrodes are employed, but depending upon the biasing configuration alternatively one of the photodetector contacts may be also be used as a counter electrode for the gate electrode. The bias may create a p-n junction in a region of the layer of graphene adjacent the waveguide. More particularly this region may lie in the region of an evanescent wave from the waveguide.

In both PTE and bolometric implementations the layer of graphene may comprise single or multi-layer graphene; the graphene may be chemically doped. The layer of graphene may be located adjacent an optical waveguide coupled to the optical source, in particular in an evanescent wave region of the waveguide. Thus the layer of graphene may be located above, below, or sandwiched within the waveguide.

The photodetector contacts may comprise electrical contacts to the graphene at points to either side of the waveguide, that is laterally to either side of a centre of the waveguide.

In PTE implementations the graphene photo-thermal effect photodetector may comprise two gate electrodes, one to either lateral side of the centre of the waveguide. Thus the p-n region formed by the biasing may also be adjacent the waveguide, more particularly in the evanescent wave region of the waveguide.

In PTE implementations the gate electrode(s) may be insulated from the layer of graphene, for example by a thin (e.g. ~10 nm) layer of oxide, but this is not essential depending, for example, upon the electrical configuration of the biasing arrangement. The gate electrode(s) may be formed from graphene, but this is not essential.

In both PTE and bolometric implementations the waveguide may be formed from any suitable material or combination of materials including, but not limited to, silicon, silicon dioxide, silicon nitride, polymer, a photonic crystal. The waveguide may be a waveguide structure such as a slot waveguide in which case where the slot is defined by a strip of electrically conducting material (such as silicon) to either side of the slot, the strips may serve as the gate electrodes. In implementations the cladding has a lower refractive index (at a wavelength of operation of the device) than the core.

In some implementations the transmitter may be integrated on a dielectric substrate such as silica or on the buried oxide (BOX) layer of a silicon-on-insulator substrate (SOI) substrate.

The waveguide may be provided on or embedded within the substrate; an upper surface of the waveguide may be substantially flush with an upper surface of the substrate or may be above the substrate. The waveguide may be formed on the substrate. The transmit antenna may also be formed on the substrate, for example in a metal layer on the substrate. In implementations the layer of graphene covers the waveguide and has contact regions at the edges which contact the metal of the transmit antenna, more specifically of an input feed of the transmit antenna. An insulating layer such as a thin layer of oxide or other electrical insulator (e.g. polymer) may be provided over the layer of graphene. In PTE implementations the gate electrodes may be located over the insulating layer, formed for example as a patterned conductive layer, e.g. of metal or graphene.

In both PTE and bolometric implementations the optical source may comprise two (or more) lasers or a single laser may be employed to generate the pair of optical lines (frequencies). For example a single optical frequency may be amplitude modulated, using say a Mach-Zender interferometer, to generate the pair of lines. The optical source may be integrated onto the substrate of an integrated transmitter and/or a separate optical input connection, such as a fibre optic connection, may be provided for one or more lasers remote to the graphene PTE device. For example a graphene-based Mach-Zender interferometer may be employed and integrated with the photodetector.

The transmit antenna may be of any convenient type depending, for example, upon the desired directionality, gain, physical size/shape and so forth. For example a dipole antenna may be employed in which case each or the photodetector contacts may be coupled to a respective arm of the dipole. In the case of, say, a patch antenna only one of the photodetector contacts may be connected to the patch; the other may have a direct or implicit (indirect) connection to ground, for example a connection to a ground plane.

Very similar structures to those described above may be used as a complementary receiver, in particular because of the high sensitivity of the system.

In PTE implementations a receive antenna may be connected to one or both of the gate(s); an electrical output may then be taken from one (or both) of the photodetector contacts. In bolometric implementations a receive antenna may be connected to one the connections to the layer of graphene, and the output from another connection to the layer of graphene.

The pair of optical lines provided by the optical source may have a spacing equal to an RF carrier frequency to which the receiver is tuned, in which case the received signal may be mixed down to baseband. Alternatively the spacing may be different to the RF carrier frequency of the signal to be received, in which case the received signal may be mixed down to an intermediate frequency. In both cases, however, the spacing of the lines defines an RF frequency at which the receiver is designed to operate, effectively a frequency to which the receiver is "tuned".

Thus in a complementary aspect an RF data receiver comprises an optical source configured to generate a pair of optical lines separated by a frequency defining an RF frequency of operation for the receiver. The receiver further comprises a photodetector comprising a layer of graphene and having at least two electrical contacts. An electrical data signal output may be connected to a first of the electrical contacts; a receive antenna may be coupled to a second of the electrical contacts, optionally via an electrical amplifier. The layer of graphene of the photodetector is illuminated by the optical source.

The electrical amplifier may comprise a broadband low-noise electrical amplifier. An input of the electrical amplifier may be coupled to the receive antenna; an output of the electrical amplifier may be coupled to the second of the electrical contacts. Additionally or alternatively an electrical amplifier may be coupled to the electrical data signal output.

The RF data receiver may include a dielectric substrate bearing the waveguide and the receive antenna, and the electrical amplifier (where present). In some implementations the layer of graphene overlies the waveguide. There may be an insulating layer over the layer of graphene and the gate electrodes may be disposed over the insulating layer. At least one of the gate electrodes may be coupled to a feed from the receive antenna, in particular via the electrical amplifier.

Other features may correspond to those of the previously described transmitter.

The photodetector may be either a PTE photodetector or a bolometric photodetector. For example in a PTE implementation the first of the electrical contacts may be connected to the layer of graphene, in particular to provide an output. The second of the electrical contacts may be connected to the at least one gate electrode of the graphene photo-thermal effect photodetector. Optionally a further, reference electrical contact is provided for the layer of graphene. Optionally the layer of graphene may be doped and/or biased as described for the transmitter. In a bolometric graphene photodetector implementation the first and second of the electrical contacts may each be electrically connected to the graphene layer.

Thus there is also described an RF data receiver which comprises an optical source configured to generate a pair of optical lines separated by a frequency defining an RF frequency of operation for the receiver. The receiver further comprises a photodetector, for example a graphene photo-thermal effect (PTE) photodetector having two photodetector contacts to output a PTE-generated voltage and having at least one gate electrode. The receiver may further comprise a receive antenna which may be coupled to the at least one gate electrode. The receiver may further comprise an electrical data signal output which may be connected to at least one of the photodetector contacts. The graphene photodetector, in particular the graphene PTE photodetector may be illuminated by the optical source.

In an integrated PTE-based data receiver at least one of the gate electrodes may be connected to a feed from the receive antenna; the electrical data signal output may comprise a metal connection to one or each of the photodetector contacts. In an integrated bolometric device the layer of graphene may be connected to a feed from the receive antenna.

In a related aspect there is provided a method of transmitting data using an RF signal comprising: illuminating a layer of graphene of a photodetector with light comprising a pair of optical lines separated by an RF carrier frequency; converting the light into an electrical signal at the RF carrier frequency using the photodetector; providing an electrical signal from an output electrode of the photodetector, wherein the output electrode is electrically coupled to the layer of graphene; and modulating the operation of the photodetector by applying a modulating electrical signal comprising (encoding) data for transmission to a second electrode of the photodetector.

The method may use a photo-thermal effect (PTE) photodetector with at least one gate electrode. The method may then further comprise biasing the at least one gate electrode to provide a Seebeck effect in the layer of graphene to generate the electrical signal from the output electrode, and applying the modulating electrical signal to the at least one gate electrode. Thus the PTE photodetector may be operated in a mode in which the layer of graphene generates a voltage via the Seebeck effect. This may be modulated by the modulating electrical signal to mix this with the optically-generated carrier, and hence up-convert the modulating electrical signal to the carrier frequency.

The method may use a bolometric photodetector, in which case the second electrode of the photodetector may be electrically connected to the layer of graphene. The method may then further comprise applying the modulating electrical signal to the second electrode to providing the electrical signal from the output electrode. Thus the bolometric photodetector may be operated in a mode in which a resistance of the layer of graphene is modulated to mix this with the optically-generated carrier and hence up-convert the modulating electrical signal to the carrier frequency.

In a complementary related aspect there is provided a method receiving data carried on an RF signal comprising: illuminating a layer of graphene of a photodetector with light comprising a pair of optical lines separated by an RF carrier frequency; providing an output electrical signal from an output electrode of the photodetector, wherein the output electrode is electrically coupled to the layer of graphene; coupling a second electrode of the graphene photodetector a receive antenna; and mixing an electrical signal from the receive antenna with the RF carrier frequency in the photodetector to down-convert the electrical signal from the receive antenna into the output electrical signal.

The method may use a graphene photo-thermal effect (PTE) photodetector with at least one gate electrode. The method may then further comprise biasing the at least one gate electrode to provide a Seebeck effect in the layer of graphene to generate a voltage using the photo-thermal effect, coupling the at least one gate electrode to the receive antenna, and outputting the PTE-generated voltage. Thus the PTE photodetector may be operated in a mode in which the layer of graphene generates a voltage via the Seebeck effect. This may be modulated by the applied gate voltage, to serve as a mixer to mix, and hence down-convert, a received signal, to an intermediate frequency or baseband.

The method may use a bolometric graphene photodetector, in which case the second electrode of the graphene photodetector may be electrically connected to the layer of graphene. The method may then further comprise providing the output electrical signal by modulating a resistance of the graphene layer using the light illuminating the layer of graphene. Thus the bolometric photodetector may be operated in a mode in which a resistance of the layer of graphene is modulated to serve as a mixer to mix, and hence down-convert, a received signal, to an intermediate frequency or baseband. A graphene-based bolometric detector can provide improved linearity, and hence dynamic range, than a semiconductor-based bolometric photodetector, and this can be important in a receiver.

There is also provided an optical transmitting system and an optical receiving system comprising means for implementing the above described methods.

In broad terms, operation of the above described techniques uses a 2D material in which the responsivity of the photodetection can be modulated by an electric field. Use of a 2D material has the advantage of low heat capacity, hence facilitating photodetection.

In the above described transmitters, receivers, methods and systems the layer of graphene may be replaced by a layer of another 2D material. In this context a 2D material may be a crystalline material; it may have a 2D crystal structure which consists of a single layer of atoms. The layer of 2D material may have one or a few such a layers of atoms; for example it may have in the range 1-20 stacked 1-atom thick layers. The layer of 2D material may comprise a heterostructure.

For example the layer of graphene may be replaced by a layer of another 2D semiconductor for example a layer of transition metal dichalcogenide with the general formula $MX_2$ where M is a transition metal such as Mo or W and X is a chalcogen atom (S, Se or Te), for example $MoS_2$ or $WS_2$. These can be advantageous because they have strong optical absorption.

DRAWINGS

These and other aspects of the invention will now be further described by way of example only, with reference to the accompanying Figures, in which.

DESCRIPTION

Figure 2A:
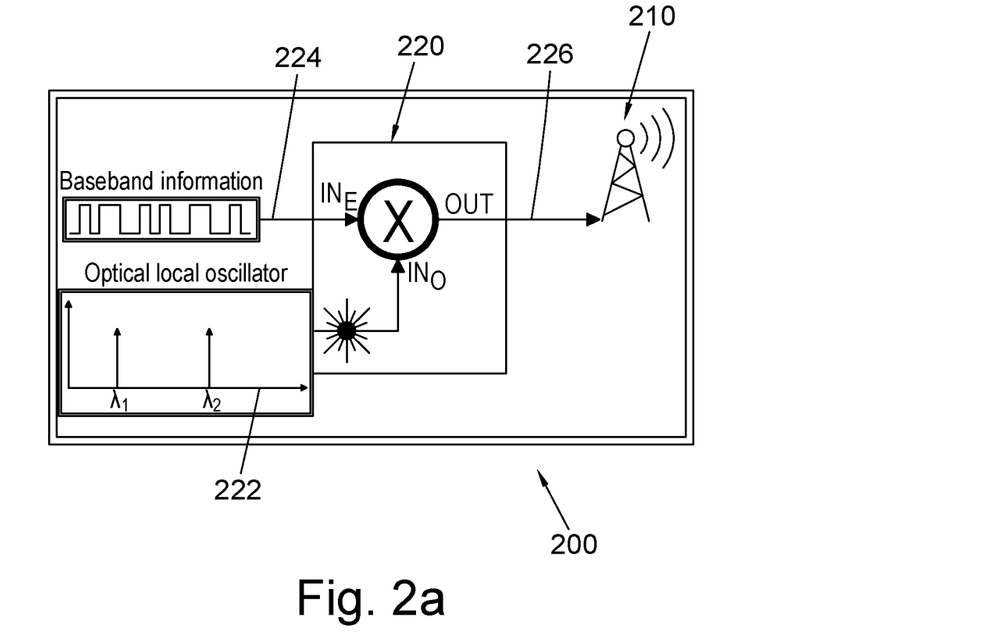
FIGS. 2a and 2b show, respectively, a schematic diagram of a transmitter and of a receiver of an RF communications system.
Figure 2B:
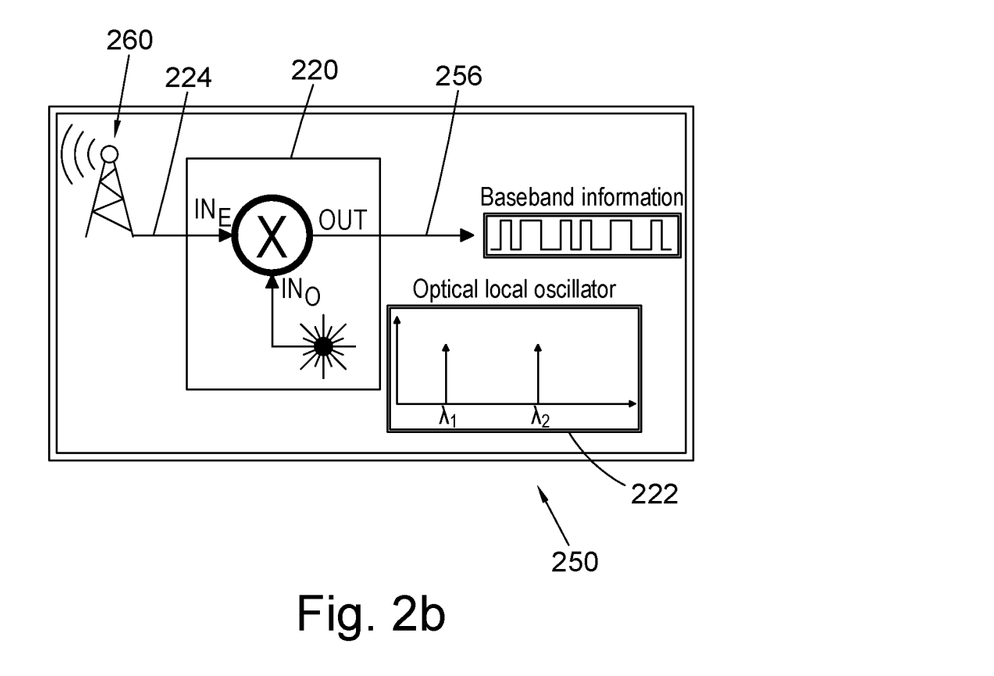

FIGS. 2a and 2b show, respectively, a schematic diagram of a transmitter 200 and of a receiver 250 of an RF communications system. Both the transmitter and receiver may be based on the same device 220, described in more detail below, comprising a mixer with one optical input 222 and one electrical input 224.

At the transmitter an optical dual-frequency optical beam acting as a local oscillator is applied to the optical input of the mixer while a baseband electrical data signal is applied to the electrical input of the mixer. Mixing generates millimeter wave radiation at an electrical output 226; the millimeter wave radiation comprises the input electrical data stream on a carrier of frequency $f_{LO}$, which corresponds to the frequency spacing of the dual wavelength laser used as the local oscillator. This microwave signal feeds a transmit antenna 210.

At the receiver 250, a receive antenna 260 receives the information centered around the millimeter wave carrier. A similar local oscillator is used to demodulate the signal to baseband 256.

Described herein are graphene-based mixing devices suitable for use in the transmitter and receiver configuration of FIG. 2. In some implementations such devices exploiting graphene's ability to detect an optical beam and produce a voltage through the photo-thermoelectric effect (PTE). In other implementations the resistance of graphene is modulated using a bolometric effect via graphene's TCR (temperature coefficient of resistance); in still other implementations a hybrid approach may be adopted.

When photons impinge on a graphene layer and are absorbed, electron-hole pairs are generated. In a PTE-based system, these electrons and holes generate a local photovoltage due to the Seebeck effect. An advantage of a photo-thermal effect graphene detector is that the responsivity can approach 1 A/W at 1550 nm wavelength, with very low dark current.

Figure 3A:
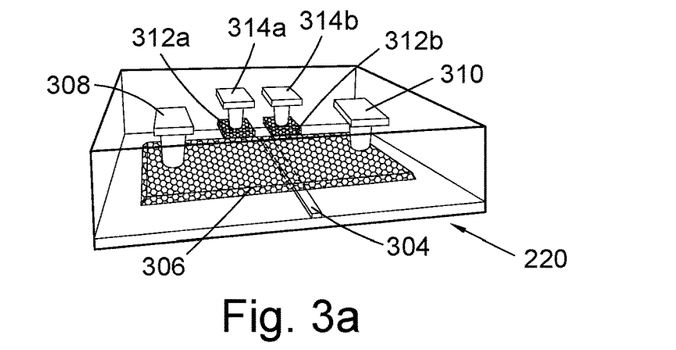
FIGS. 3a to 3c show, respectively, a 3D perspective view, a 2D vertical cross-sectional view, and a schematic view of a structure of a PTE graphene-based mixer for the transmitter and receiver of FIG. 2.
Figure 3B:
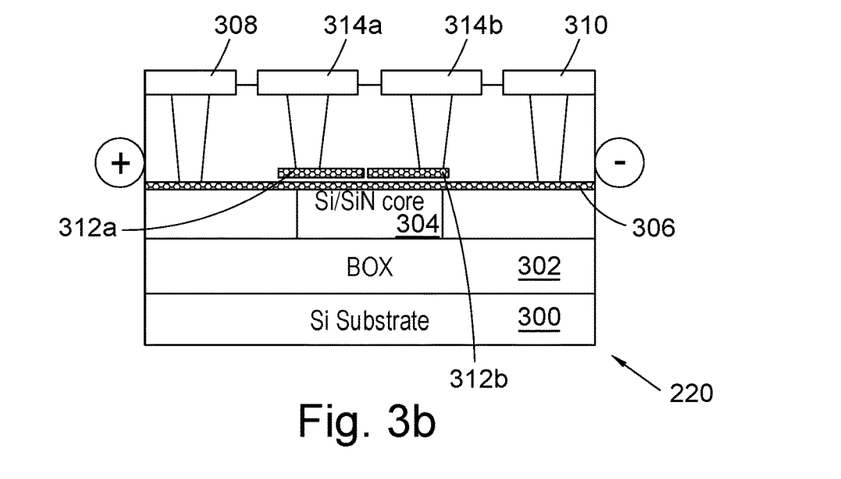
Figure 3C:
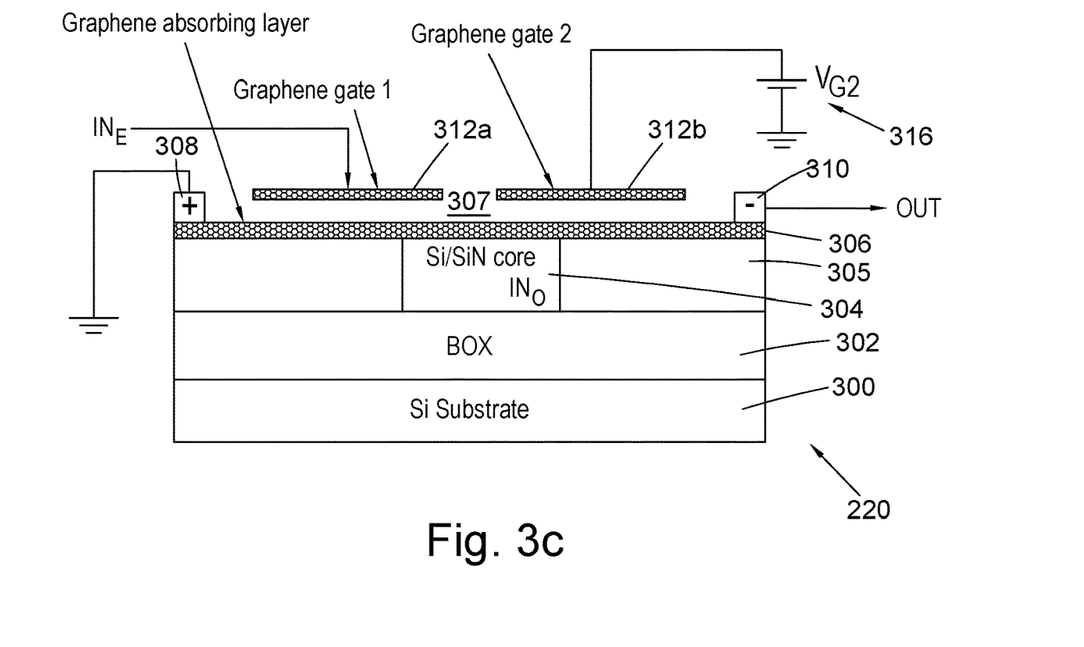

The amount of generated photovoltage can be maximized by biasing graphene near to the charge neutrality (Dirac) point. FIGS. 3a to 3c show, respectively, a 3D perspective view, a 2D vertical cross-sectional view, and a schematic view, of a structure of a graphene-based mixer 220 for the transmitter and receiver of FIG. 2. In this example the mixer employs two graphene layers.

The mixer comprises an optical waveguide 304, for example made of silicon or silicon nitride (the latter providing wider bandwidth operation), or doped germanium, in oxide 305. The waveguide is supported on a buried oxide layer 302 of a silicon (silicon-on-insulator) substrate 300. The mixer further comprises a lower graphene layer 306 where a photovoltage is generated. The photovoltage appears across "negative" and "positive" electrical contacts 308, 310. In the illustrated example contact 308 is connected to a reference (ground) electrode and contact 310 provides an electrical output (OUT).

A dielectric layer 307, for example of silicon dioxide, is provided over the graphene layer 306. An upper graphene layer over dielectric layer 307 is patterned to define gates 312a,b for the lower graphene channel 306, with respective connections 314a,b.

A bias voltage from a bias voltage generator 316 may be applied to one (or both) of the two gates 312a,b. The bias with respect to the graphene channel 306 defines a chemical potential profile in the graphene layer 306 via the field effect to provide a Seebeck effect. The bias voltage may be adjusted to maximize the photo-thermoelectric (PTE) effect.

In broad terms the carrier density within the layer of graphene is adjusted by the voltage(s) on the gate electrode(s). Photo-excited electrons in this region heat the graphene and a PTE voltage is generated by the Seebeck effect. The magnitude of the PTE voltage depends, among other things, on the electronic temperature difference between areas of different doping level (defined by the gate voltage(s)). Typically a bias voltage applied between the gate electrodes is near, but not at, the Dirac voltage, that is the charge neutrality point voltage (which may be in the range +/−1-10 volts). The Dirac point voltage depends on the doping: there is typically intrinsic doping and there may be extrinsic doping and the effective doping can be varied by varying the applied bias—a negative bias makes the graphene n-doped and vice-versa (varying the type of majority charge carrier) and at the Dirac point the carrier density is close to zero and resistivity is at a maximum.

The magnitude of the PTE effect in a particular device at a particular wavelength may be selected and maximized by plotting the variation in photovoltage against variation in gate voltage difference over a range of, say 0-10 volts, and/or by calculating the Seebeck coefficient using the Mott equation. In broad terms the magnitude of the effect depends on the magnitude of the difference between the gate voltage difference and Dirac voltage; the sign of the difference determines the sign of the photo-voltage.

Referring again to FIG. 3, a dual-wavelength laser beam at frequencies spaced at e.g. ≈100 GHz travels inside the optical waveguide. When detected in the graphene channel beating of the two frequencies generates an e.g. 100 GHz electrical sine wave. In implementations the optical frequencies have low phase noise and low jitter and define a millimeter wave carrier.

When the device is used in a transmitter, for example as the graphene-based mixer 220 in the transmitter of FIG. 2a, an electrical data signal, comprising e.g. encoding for transmission is applied to one of the two gates 312a,b. This electrical signal modifies the Seebeck coefficient responsible for the photothermoelectric effect which in turn modulates the photodetector responsivity. Thus a mixing between the data signal and the local e.g. 100 GHz oscillator is produced. The resulting photovoltage on electrical output contact 310, containing the data on a carrier at e.g. around 100 GHz, is sent to the transmit antenna 210.

When the device is used in a receiver, for example as the graphene-based mixer 220 in the receiver of FIG. 2b, the receive antenna 260 is coupled to one of the two gates 312a,b to provide an electrical data signal input ($IN_E$). Thus information received at the antenna, centered at around 100 GHz, is feed to a gate of the device while the optical oscillator is injected into the optical waveguide as in transmission. This device demodulates the received signal to a baseband electrical data signal, comprising data to be received, using the same physical principle as described above.

When the device is used in a transmitter or in a receiver an electrical (electronic) amplifier may be included between the device and the antenna.

This approach is useful because the voltage which has to be applied to the gate in order to modulate the Seebeck coefficient profile along the graphene channel (and so to obtain mixing) is very low. This is particularly attractive for signals received from an antenna, which can be very small.

Figure 4:
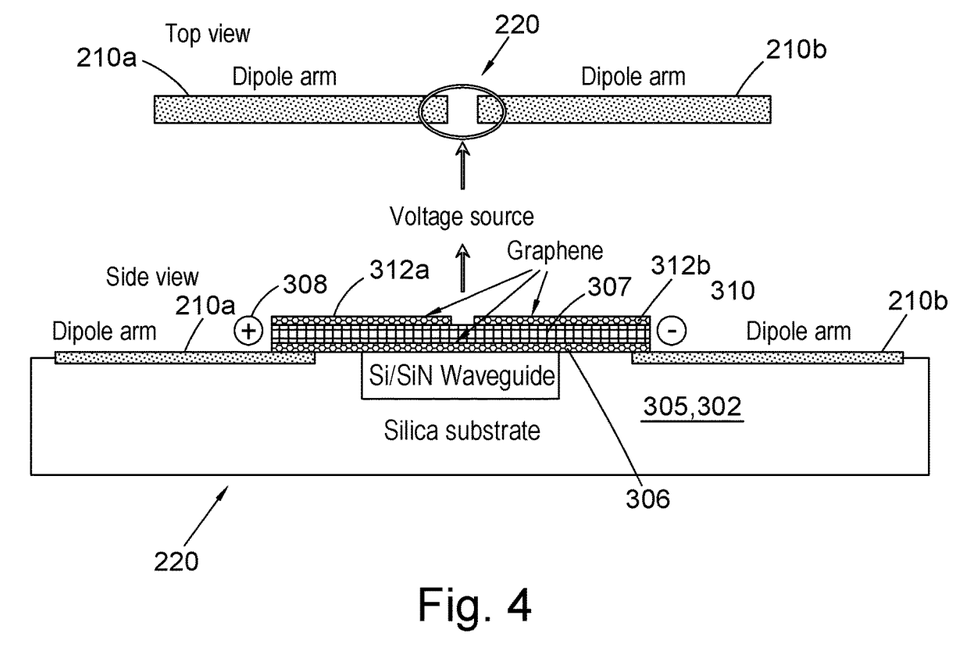
FIG. 4 shows respectively, top and vertical cross-sectional views through an integrated mixing device and antenna of the type shown in FIG. 3.

FIG. 4 shows a top view and a vertical cross-sectional view through an integrated mixing device and transmitting antenna, where the mixing device is of the type described above. The integrated mixing device and transmitting antenna may form part of an integrated transmitter; the laser source for the local oscillator may also be integrated or may be separate. An integrated mixing device and receiving antenna, and hence an integrated receiver, may be fabricated in a similar manner but noting the different connections to the mixing device. In some other implementations however the antenna may, for example, be provided in a separate/external co-package.

In FIG. 4 like elements to those previously described are indicated by like reference numerals. The illustrated example shows use of a dipole antenna comprising metallic arms 210a,b supported by the dielectric, e.g. silica, substrate 302.

The structure, which in some implementations is a double-layer graphene structure, produces a voltage that comprises a modulated signal on top of an e.g. ≈100 GHz carrier, implementing the mixer 220 of FIG. 1a. This voltage is applied to the two arms 210a,b of the dipole, or to the feed(s) of some other antenna, and is radiated into the air.

In a receiver configuration, the antenna is connected to one of the gates or between one of the gates and the graphene channel.

Other types of antenna may be employed instead of the illustrated dipole antenna including, but not limited to: a bow-tie antenna or a spiral antenna (both useful for wide-band operation); or a patch antennas (useful for high-gain performance). The patch antenna may be provided with a reflecting ground plane which may be formed, for example, on, under, or within the substrate 302.

In some implementations an antenna as described above may be coupled to the mixing device via an amplifier, for example to amplify the signal from a receive antenna or to a transmit antenna. Such an amplifier may comprise an electrical (electronic) amplifier such as a GaAs-based or graphene-based amplifier. In a transmitter a similar electrical (electronic) amplifier may be coupled between the mixer and antenna (with some reconfiguration of the arrangement illustrated).

Figure 5:
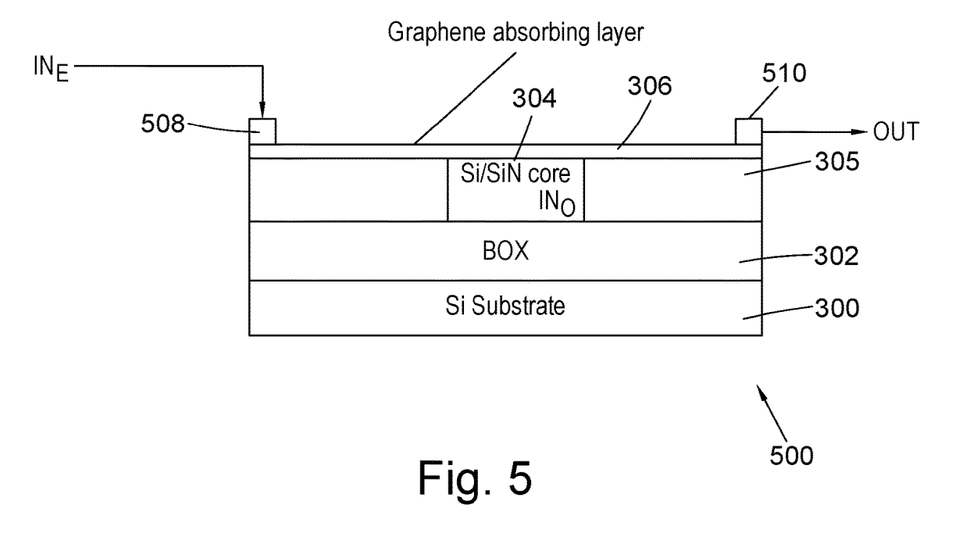
FIG. 5 shows a schematic view of a structure of a bolometric graphene-based mixer for the transmitter and receiver of FIG. 2.

FIG. 5 shows a schematic view of a structure of a bolometric graphene-based mixer 500 for the transmitter and receiver of FIG. 2; again like elements are indicated by like reference numerals.

Thus in a bolometric graphene-based mixer for a transmitter a first electrical contact 508 to the graphene layer 306 provides an electrical data signal input ($IN_E$) and a second electrical contact 510 to the graphene layer 306 provides an electrical output (OUT) to the transmit antenna. In a receiver contact 508 ($IN_E$) is coupled to the receive antenna and a down-converted electrical data signal output is provided on contact 510 (OUT). The resistance between contacts 508, 510 is modulated by the incident light, more particularly the RF difference frequency between the two optical lines. The voltage on the electrical data signal input modulates the response of the device to the incident light, for example modulating the TCR of the layer of graphene. In effect the electrical data signal modulates the bias of the bolometric photodetector.

The electrical input may, for example, be a sine wave centered around e.g. 0 volts. In general no bias is needed but optionally semiconductor substrate 300 may be biased with respect to ground (defined, for example, by a ground of the input sine wave) to adjust the Fermi level of the graphene layer, for example to increase the Fermi with respect to the Dirac point by polarizing the substrate a little, for example if the Fermi level is outside the Dirac point.

The structures of FIGS. 3-5 may be fabricated using a CMOS-compatible fabrication process.

Wafer scale integration of the optical waveguide may be used to guide the pair of optical wavelengths. A pair of lasers used to implement beating in the photodetector may be either located in proximity to the transmitter/receiver chip, or remotely located and coupled to the transmitter/receiver chip with fibers. Alternatively a single laser may be amplitude modulated using a Mach-Zender interferometer to generate the pair of lines.

In a receiver an RF amplifier may be provided following the mixer; this may be integrated on the same substrate as the mixing device and receiving antenna. In a transmitter an RF amplifier may be provided to drive the gate connection providing the electrical signal for transmission; this may be integrated on the same substrate as the mixing device and transmit antenna.

One or more of a graphene-based photodetector, a graphene-based Mach-Zender interferometer, and a graphene-based amplifier may be integrated on a common substrate.

In some implementations a PTE-based device may be more efficient than a bolometric effect based device when used with small electrical signals. This is because the best operating point of the PTE-based devices is typically close to the neutrality point e.g. ~40 mV from this point (small carrier doping). Thus a small change in voltage can cause a useful change in responsivity. Dark current noise, dynamic range, and/or sensitivity may also be improved.

In broad terms techniques have been described which facilitate the use of a high carrier frequency, for example above 10 GHz and optionally above 100 GHz up to several THz. In some implementations photogeneration using the photo-thermo electric effect (Seebeck effect) photodetector operates as a mixer to provide an RF local oscillator by means of the beating of two optical wavelengths whose spectral separation matches the carrier frequency. In other implementations bolometric photodetection is employed. Such approaches can provide improved responsivity and reduced dark current compared to other graphene-based approaches, and only a low voltage may be needed to modulate/demodulate information. In some transmitter implementations the data may be applied to the mixer without additional modulation; similarly there may be no demodulation at the receiver.

Whilst example implementations using bolometric and PTE-based photodetectors have been described there are also contemplated devices and methods which employ other techniques for modulating the responsivity of the photodetector using an electric field. For example using a PTE-type structure a mode of operation of the device may be switched between PET and bolometric modes by changing bias on the device, and this may be used to modulate the photodetector response to implement a mixer. In a still further approach a device as described above may be configured to operate as a Dyakonov-Shur detector (in which the incident radiation modulates carrier drift velocity and carrier density), e.g. dividing the layer of graphene (or other 2D material) to define a FET structure, and modulating the generated photovoltaic effect voltage by a voltage applied to the gate.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. An RF data transmitter comprising:
   an optical source configured to generate a pair of optical lines separated by an RF carrier frequency;
   a photodetector comprising a layer of graphene and having at least two electrical contacts;
   a transmit antenna coupled to a first of the electrical contacts, in particular via an electrical amplifier; and
   an electrical data signal input connected to a second of the electrical contacts;
   wherein the layer of graphene of the photodetector is illuminated by the optical source.

2. An RF data transmitter as claimed in claim 1 comprising an optical waveguide, wherein the layer of graphene is adjacent the optical waveguide.

3. An RF data transmitter as claimed in claim 2 comprising a dielectric substrate bearing the waveguide and the transmit antenna, wherein the layer of graphene overlies the waveguide, and wherein the first of the electrical contacts is configured to couple the layer of graphene to an input feed of the transmit antenna, in particular via the electrical amplifier.

4. An RF data transmitter as claimed in claim 1, wherein the photodetector has electrical contacts to the layer of graphene at points to either side of a centre of the waveguide.

5. An RF data transmitter as claimed in claim 1, wherein the photodetector is a photo-thermal effect (PTE) photodetector and wherein the first of the electrical contacts outputs a PTE-generated voltage; wherein the photo-thermal effect photodetector has at least one gate electrode and wherein the second of the electrical contacts is connected to the at least one gate electrode such that the electrical data signal input is coupled to the at least one gate electrode.

6. An RF data transmitter as claimed in claim 5 when dependent upon claim 4 wherein the electrical contacts at points to either side of a centre of the waveguide comprise the first of the electrical contacts and a third electrical contact.

7. An RF data transmitter as claimed in claim 5 further comprising a bias voltage generator coupled to the at least one gate electrode to bias the photo-thermal effect photodetector to generate a Seebeck effect in the layer of graphene of the photo-thermal effect photodetector.

8. An RF data transmitter as claimed in claim 5 wherein the photo-thermal effect photodetector comprises two gate electrodes one to either side of the centre of the waveguide and adjacent to but insulated from the layer of graphene.

9. An RF data transmitter as claimed in claim 5 further comprising an insulating layer over the layer of graphene, wherein the at least one gate electrode is disposed over the insulating layer.

10. An RF data transmitter as claimed in claim 1 wherein the photodetector comprises a bolometric photodetector.

11. An RF data transmitter as claimed in claim 10 when dependent upon claim 4 wherein the electrical contacts to the layer of graphene at points to either side of the centre of the waveguide comprise the first and second of the electrical contacts.

12. An RF data transmitter as claimed in claim 10 wherein the bolometric photodetector is supported on a semiconductor substrate, and further comprising a biasing system to bias one or both of the electrical data signal input and the semiconductor substrate.

13. An RF data transmitter as recited in claim 1 wherein the layer of graphene is replaced by a layer of 2D material such as a layer of transition metal dichalcogenide.

14. A method of transmitting data using an RF signal comprising:
   illuminating a layer of graphene of a photodetector with light comprising a pair of optical lines separated by an RF carrier frequency;
   converting the light into an electrical signal at the RF carrier frequency using the graphene photodetector;
   providing an electrical signal from an output electrode of the photodetector, wherein the output electrode is electrically coupled to the layer of graphene; and
   modulating the operation of the photodetector by applying a modulating electrical signal comprising data for transmission to a second electrode of the photodetector.

15. A method as claimed in claim 14 wherein the photodetector comprises a photo-thermal effect (PTE) photodetector with at least one gate electrode, the method further comprising biasing the at least one gate electrode to provide a Seebeck effect in the layer of graphene to generate the electrical signal from the output electrode, and applying the modulating electrical signal to the at least one gate electrode.

16. A method as claimed in claim 14 wherein the photodetector comprises a bolometric photodetector, wherein the second electrode of the photodetector is electrically connected to the layer of graphene, the method further comprising applying the modulating electrical signal to the second electrode to providing the electrical signal from the output electrode.

17. An RF data receiver comprising:
- an optical source configured to generate a pair of optical lines separated by a frequency defining an RF frequency of operation for the receiver;
- a photodetector comprising a layer of graphene and having at least two electrical contacts;
- an electrical data signal output connected to a first of the electrical contacts;
- a receive antenna coupled to a second of the electrical contacts, in particular via an electrical amplifier; and
- wherein the layer of graphene of the photodetector is illuminated by the optical source.

18. An RF data receiver as claimed in claim 17 comprising an optical waveguide, wherein the layer of graphene is adjacent the optical waveguide.

19. An RF data receiver as claimed in claim 17 wherein the photodetector comprises a photo-thermal effect (PTE) photodetector comprising at least one gate electrode, wherein the first of the electrical contacts is connected to the layer of graphene, and wherein the second of the electrical contacts is connected to the at least one gate electrode of the photo-thermal effect photodetector.

20. An RF data receiver as claimed in claim 19 further comprising a bias voltage generator coupled to the at least one gate electrode to bias the photo-thermal effect photodetector to generate a Seebeck effect in the layer of graphene of the photo-thermal effect photodetector.

21. An RF data receiver as claimed in claim 19 when dependent upon claim 18, comprising electrical contacts to the layer of graphene at points to either side of a centre of the waveguide, wherein the photo-thermal effect photodetector further comprises two gate electrodes one to either side of the centre of the waveguide and adjacent to but insulated from the layer of graphene.

22. An RF data receiver as claimed in claim 21 comprising a dielectric substrate bearing the waveguide and the receive antenna, wherein the layer of graphene overlies the waveguide, and further comprising an insulating layer over the layer of graphene, wherein the gate electrodes are disposed over the insulating layer, wherein at least one of the gate electrodes is coupled to a feed from the receive antenna, in particular via the electrical amplifier.

23. An RF data receiver as claimed in claim 17 wherein the photodetector comprises a bolometric photodetector, and wherein the first and second of the electrical contacts are each electrically connected to the layer of graphene.

24. A method receiving data carried on an RF signal comprising:
- illuminating a layer of graphene of a photodetector with light comprising a pair of optical lines separated by an RF carrier frequency;
- providing an output electrical signal from an output electrode of the photodetector, wherein the output electrode is electrically coupled to the layer of graphene;
- coupling a second electrode of the photodetector a receive antenna; and
- mixing an electrical signal from the receive antenna with the RF carrier frequency in the photodetector to down-convert the electrical signal from the receive antenna into the output electrical signal, wherein the output electrical signal comprises received data.

25. A method as claimed in claim 24 wherein the photodetector comprises a photo-thermal effect (PTE) photodetector with at least one gate electrode, the method further comprising biasing the at least one gate electrode to provide a Seebeck effect in the layer of graphene to generate a voltage using the photo-thermal effect, coupling the at least one gate electrode to the receive antenna, and outputting the PTE-generated voltage; or wherein the photodetector comprises a bolometric photodetector, and wherein the second electrode of the photodetector is electrically connected to the layer of graphene, the method further comprising providing the output electrical signal by modulating a resistance of the graphene layer using the light illuminating the layer of graphene.

* * * * *